United States Patent [19]

Dungs et al.

[11] Patent Number: 5,730,769
[45] Date of Patent: Mar. 24, 1998

[54] AIR FILTER WITH SCALING BEAD FREELY MOVABLE IN THE RADIAL DIRECTION

[75] Inventors: Guenter Dungs, Moeglingen; Peter Fischer, Ulm; Klaus Moessinger, Obersulm, all of Germany; Guenter Thaller, Lienz, Austria

[73] Assignee: Filterwerk Mann & Hummel GmbH, Ludwigsburg, Germany

[21] Appl. No.: 454,216

[22] PCT Filed: Dec. 7, 1993

[86] PCT No.: PCT/EP93/03435

§ 371 Date: Dec. 18, 1995

§ 102(e) Date: Dec. 18, 1995

[87] PCT Pub. No.: WO94/13389

PCT Pub. Date: Jun. 23, 1994

[30] Foreign Application Priority Data

Dec. 10, 1992 [DE] Germany .............. 42 41 586.1

[51] Int. Cl.⁶ ........................................... B01D 46/24
[52] U.S. Cl. .................. 55/385.3; 55/482; 55/498; 55/502; 55/510; 123/198 E
[58] Field of Search .................. 55/498, 502, 500, 55/503, 504, 505, 507, 482, 520, 385.3, 310; 95/273; 123/198 E

[56] References Cited

U.S. PATENT DOCUMENTS

| | | | |
|---|---|---|---|
| 3,307,336 | 3/1967 | Dewsberry | 55/385.3 |
| 3,616,618 | 11/1971 | Gronholz et al. | 55/502 |
| 3,672,130 | 6/1972 | Sullivan et al. | 55/498 |
| 4,020,783 | 5/1977 | Anderson et al. | 55/482 |
| 4,135,899 | 1/1979 | Gauer | 55/482 |
| 4,243,397 | 1/1981 | Tokar et al. | 55/498 |
| 4,261,710 | 4/1981 | Sullivan | 55/502 |
| 4,278,455 | 7/1981 | Nardi | 55/498 |
| 4,304,580 | 12/1981 | Gehl et al. | 55/482 |
| 4,350,509 | 9/1982 | Alseth et al. | 55/498 |
| 4,536,291 | 8/1985 | Hoffman et al. | 55/498 |
| 4,720,292 | 1/1988 | Engel et al. | 55/337 |
| 5,064,458 | 11/1991 | Machado | 55/482 |
| 5,112,372 | 5/1992 | Boeckermann et al. | 55/498 |
| 5,120,337 | 6/1992 | Benzler et al. | 55/482 |
| 5,171,342 | 12/1992 | Trefz | 55/498 |
| 5,415,677 | 5/1995 | Ager et al. | 55/498 |
| 5,487,767 | 1/1996 | Brown | 55/502 |
| 5,547,480 | 8/1996 | Coulonvaux | 55/498 |
| 5,556,440 | 9/1996 | Mullins et al. | 55/502 |

FOREIGN PATENT DOCUMENTS

94/13389  6/1994  WIPO ........................ 55/502

*Primary Examiner*—Duane S. Smith
*Attorney, Agent, or Firm*—Evenson, McKeown, Edwards & Lenahan P.L.L.C.

[57] ABSTRACT

An air filter, in particular for cleaning the combustion air for internal combustion engines, having a cylindrical housing provided with an unfiltered air inlet and with a clean air outlet mounted substantially concentrically on one of the axial end faces of the housing. An extension tube, which extends into the housing, is provided at the clean air outlet; a center tube, which extends into the housing, is secured to the inner wall of the extension tube, and a metal-free filter insert is slid onto the center tube. The filter insert has a radial packing on its end face which faces the extension tube, and the opposite end face of the insert is closed. The radial packing is provided with a sealing bead which is freely movable in the radial direction. A metal-free safety cartridge optionally may be arranged inside the center tube.

20 Claims, 4 Drawing Sheets

AIR FILTER WITH SEALING BEAD FREELY MOVABLE IN THE RADIAL DIRECTION

BACKGROUND OF THE INVENTION

The invention relates to filter, in particular for the intake air for internal combustion engines.

From the U.S. Pat. nO. 4,720,292 an air filter is known with the following features: a housing with an axial outlet opening and a substantially open second end which is closeable by a removable cover. At the periphery of the housing, an air inlet opening is arranged. In the housing, there is a substantially cylindrical filter element with an inner support tube, for a filter with an outer support tube, whereby the inner filter element is arranged coaxially in the housing. The sealing of the filter element to the housing is affected via an annular end plate, which has a substantially cylindrical, radially-inwardly directed surface, and which is pushed over an inner section of the outlet part.

As is well known, the filter inserts of air filters are exchanged after a predetermined operating time. Depending on the occurrence of dust, the operating time of an air filter can amount to from a few days (construction machines) up to several months. The filter insert known from the above-mentioned U.S. Pat., as well as other conventionally utilized filter inserts, consists of a combination of materials, whereby, in particular, sheet steel is utilized for the supporting tubes. The actual filter medium is paper or a fleece of synthetic fibers. The end plates are composed of synthetic plastic (soft elastomer). A disposal of such an air filter or a separation into the individual component materials is very costly and, therefore, up to this time, has been uneconomical.

In accordance with the controlling "Technical Regulations on Waste" in the Federal Republic of Germany, the principle of avoiding generation of waste takes precedence over the recovery or recycling of waste and over the disposal of waste. Preconditions for waste reprocessing procedures are that the reprocessing be technically feasible, the costs of the reprocessing be attainable, and that a market exist or can be created for the recovered material or energy. Only when these criteria are not fulfilled is the waste to be disposed of in accordance with the regulations.

Up to this time, the reprocessing of air filter inserts has not been feasible due to the above-described disadvantages.

A further disadvantage of the known state of the art is to be seen in that a relatively large housing is required for the air filter inserts which takes up an unnecessarily large amount of space in the clean air region.

SUMMARY OF THE INVENTION

The invention, therefore, is based on the object of providing a filter whose filter insert in a metal-free embodiment can be disposed of without any difficulty and which is as compact as possible in construction.

The invention has the advantage compared to the previously known state of the art that the filter parts, which are not subjected to wear or to consumption, are fixedly arranged on the housing, and thus only those parts are exchanged which are subject to consumption.

This means that it is only necessary to exchange the filter means, i.e. the paper or the fleece with the two end plates, while the synthetic plastic center tube, or other elements similar to synthetic plastic supporting tubes, valves or the like, remain in the filter housing.

A further advantage of the invention lies in the fact that by arranging the radial seal outside of the filter region, a substantial reduction of the size of the filter construction is achieved. It is further advantageous in the invention that the radial seal is not enclosed in the radial direction by the filter insert or other limiting means, but instead is freely moveable and thereby achieves a higher elasticity and consequently also a higher reliability, particularly in the case of oscillations or vibrations.

In accordance with one embodiment of the invention, the filter insert is supported with a closed end face on the cover of the housing. This supporting takes place via protuberances which lie adjacent the inner wall. In this way, a force-keyed connection is achieved, and the filter insert is axially secured.

This manner of securing is simultaneously a method of attachment which is suited for damping the influence of vibrations without it being necessary to support the filter insert at the lateral wall surfaces.

In accordance with a further embodiment of the invention, it is envisioned to arrange a secondary element inside the center tube. This secondary element has the characteristic of preventing falling dirt, dust or the like, from entering the clean air region of the filter when the filter insert is exchanged and of protecting the motor against dust damage when the filter paper of the main cartridge is damaged. The secondary element is not replaced every time the filter insert is exchanged; instead, it is only renewed after several filter exchange cycles. The secondary element is inserted in the center tube and is releasably attached to the center tube via the front end plate. In order that this secondary element is fixed in the installed position, the filter insert, i.e. the main cartridge, is provided with a stop surface which is oriented toward the secondary element and against which the secondary element lies. The side of the stop surface which faces the cover is provided with protuberances which support it with respect to the cover. This manner of attachment of the secondary element has proved to be extremely reliable.

In a preferred embodiment of the invention, the filter insert is a paper or fleece formed in star-folded form. The end faces of this filter insert are provided with end plates of polyurethane resin (PUR) foam. The seal profile is integrated in these end plates.

In order to attach the center tube, a groove is provided on the extension tube in an advantageous manner. This groove is located on its inner wall. The center tube is provided with a bulge and is pressed into the extension tube so that the bulge comes in contact with the groove and forms a rigid connection of the center tube with the mounting tube and with the housing.

In particular, in operations where there is a lot of dust, it is advantageous to separate large dust before the actual filter in a suitable manner. For this purpose, the unfiltered air inlet is constructed tangentially and is provided with a diverting wall. Both of these produce a spiral flow of the unfiltered air. This spiral flow works like a cyclone so that the large dust is flung outwardly and passes to a dust outlet valve in the vicinity of the inner wall of the housing.

In accordance with a further advantageous embodiment of the invention, the connection of the housing and cover is effected by means of a detent element. Such a device may be, for example, a snap latch which is arranged with a bendable hinge on the cover or housing and which engages behind a flange of the element to be connected and latches there. The cover can be attached in virtually any desired rotational position with respect to the housing. For this purpose, the contact region between the housing and cover is equipped with detent elements. These prevent any unintended pivoting of the cover on the housing caused by shaking or vibration during the operation of the motor.

A further advantageous embodiment of the invention envisions providing the outer jacket of the filter housing with a polygonal shape. This filter housing is placed on a fastening element, which is adapted in conjunction with the polygonal shape to fix the filter housing in a form-locked manner in nearly any desired installed position. The attachment element is substantially comprised of a base plate, which has a tension band which grips the polygonal shape of the housing. Furthermore, this polygonal shape can be equipped with detent recesses, which are provided both in the circumferential and also in the axial direction. In this case, the attachment element is provided with detent cams which engage in these recesses. Since the detent recesses are arranged in both the circumferential direction and in the axial direction, a form-locked attachment of the housing can take place in several positions which vary in the axial direction. The filter is therefore suitable to adapt to nearly any desired number of installation conditions and to assure an optimum filter effect for any desired installed position.

These and further features of preferred embodiments of the invention can be derived from the description and the drawings, in addition to from the claims, whereby the individual features each may be realized alone or in groups in the form of subcombinations in the embodiments of the invention and in other fields of use and may represent advantageous, individually protectable embodiments, for which protection is claimed here. Embodiments of the invention are illustrated in the drawings and are explained in more detail in the following.

DETAILED DESCRIPTION OF PREFERRED EMBODIMENT

Figure 1:
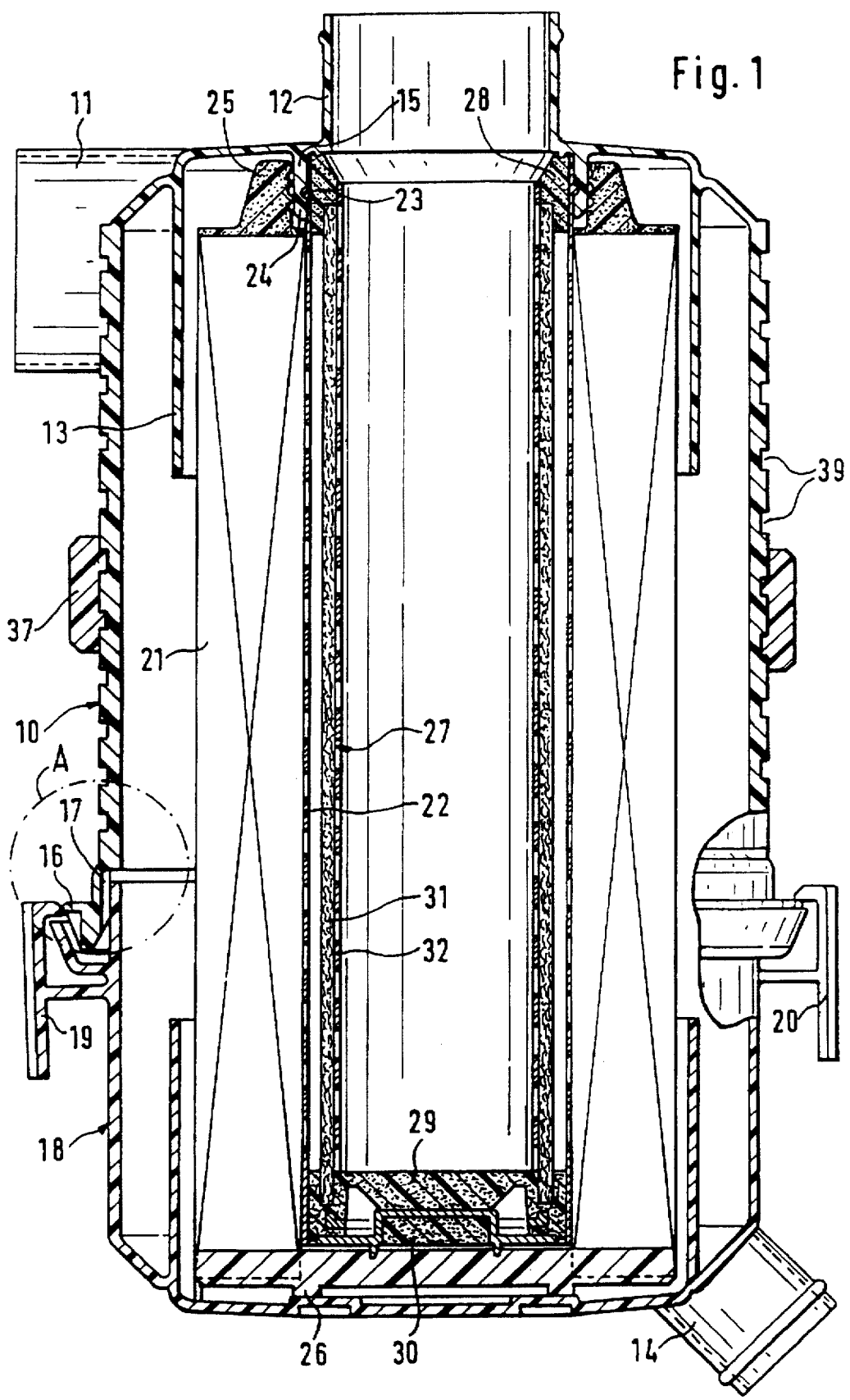
FIG. 1 A filter in a sectional view.

The filter shown in FIG. 1 is illustrated two half sections. The left half section shows the filter with a slightly opened cover, while the right half section shows the filter with the cover closed. The filter comprises a cylindrical housing 10 with an unfiltered air inlet 11 and a clean air outlet 12. In the vicinity of the unfiltered air inlet, a diverting wall 13 (immersion tube) is provided. In conjunction with the unfiltered air inlet which leads tangentially into the housing 10, a spiral flow of the unfiltered air forms. This causes a separation of coarse dust particles, whereby these coarse dust particles pass downwardly along the inner wall of the filter and are conducted into the open via a dust outlet opening 14, which is closed with a known dust outlet valve.

An advantageous embodiment of a filter is seen in that the center tube is arranged fixed to the housing. Since this center tube is not subject to wear or consumption, it is not necessary to exchange it. In an expedient manner, this center tube, which consists, in particular, of synthetic plastic, is connected in a force-locking manner with the extension tube of the housing. In accordance with one embodiment of the connection center tube-extension tube, the center tube is provided with sealing lips which are arranged in the area of the connection and assure a reliable seal. In contrast to the filter insert, the secondary element is not cleaned, but instead is exchanged, if necessary. A cleaning operation, for example by knocking loose or washing out, is not expedient, since the secondary element may be damaged by this cleaning operation and thereby lose its effect. It is therefore equipped with a release grip, which makes it possible to recognize whether the secondary element has been removed. This release grip is provided with a grip flange, which consists of synthetic plastic and is connected with this end plate by an injection-molded web. If the secondary element is to be removed, then this injection-molded web is torn open and the grip flange is pulled up. Using this grip flange, the secondary element can be taken out. Since the grip flange is now in the opened state, it can be immediately recognized that the secondary element has been removed. In accordance with a further embodiment, the secondary element is provided with a radial and/or axial seal. In particular, the axial seal effect is supported by a bulge on the extension tube.

The housing 10 is further provided with an extension tube 15, as well as with an annular detent latch projection 16 and a cylindrical receptacle 17 for a cover 18. The cover 18 is constructed in the form of a pot and is provided with at least two detent latch elements 19, 20. These detent latch elements are pivotally connected with the cover via so-called bendable hinges and are produced together with the cover of synthetic plastic in a single manufacturing step. They grip behind the detent latch projection 16 of the housing 10. In the left partial section of FIG. 1, the detent latch element 19 is shown in the open position. In the right partial section or in the cut-out view, the detent latch element 20 is illustrated in the closed position.

A metal—or synthetic plastic—center tube 22 is attached to the projecting tube 15 of housing 10. In order to secure this center tube in a form-locked manner, the tube is provided with a bulge 23 which snaps into a groove 24 of the projection tube 15. It is thus no longer possible to unintentionally remove the center tube.

A filter insert 21 is pushed over the center tube 22. On its upper end face this filter insert carries a radial seal, which forms a unit with the end plate 40 (see FIG. 3) of the filter insert. This radial seal comprises an annular bulge 25 lying outside the plane of the filter. The bulge sealingly encloses the extension tube 15. In this type of seal, a change in axial length of the filter insert plays an insignificant role. In addition, this type of seal is also extremely reliable in case of shaking and vibration.

The filter insert 21 is supported at its rear end on the cover 18 via protrusions 26. These protrusions, which also may be formed as deformation ribs, serve to axially fix the filter insert and to dampen vibrations of the cartridge which is arranged in the rearward region to lie freely on the center tube 22. Inside the center tube 22, a secondary element 27 is arranged. This is provided at its forward end with a PUR-foam end face seal 28. This end face seal is connected in a force-locked manner with the extension tube 15. The rearward end of the secondary element 27 is provided with a PUR-foam end face seal 29. A synthetic plastic grip is integrated in this end plate 29 which serves to remove the secondary element manually, if necessary. The secondary element expediently comprises a fleece 31 which is pushed onto a supporting tube 32. The axial force for sealing the secondary element against the clean air outlet is applied via the cover 18 and the protrusions 26 of the filter insert 21 to the end face seal 29.

Since the secondary element 21 is completely enclosed by the center tube 22, there is no danger that during exchange of the filter insert the secondary element will inadvertently be removed or fall out.

During assembly of the entire filter, the secondary element is initially inserted, the filter insert 21 is subsequently pushed thereover, and the cover 18 is applied. As a result of supporting the secondary element on the filter insert 21, at the rear end, and simultaneously supporting the filter insert 21 on the cover 18, both elements are brought into their correct position by pushing on the cover. This means that incorrect assembly of the two elements is not possible. The end position of these elements is achieved by closing the cover 18 on the receptacle 17.

The metal-free secondary element can be disposed of without any difficulty. The fleece, PUR-foam end plates, synthetic plastic center tube, and synthetic plastic grip can be disposed of thermally, for example.

Because the filter insert 21 has an end-face seal of PUR-foam on both end faces, it is possible without further ado to knock out this filter insert and free it from the dirt layer. The elastic end plates are not damaged during this as would be the case, for example, with sheet metal end plates.

Figure 2:
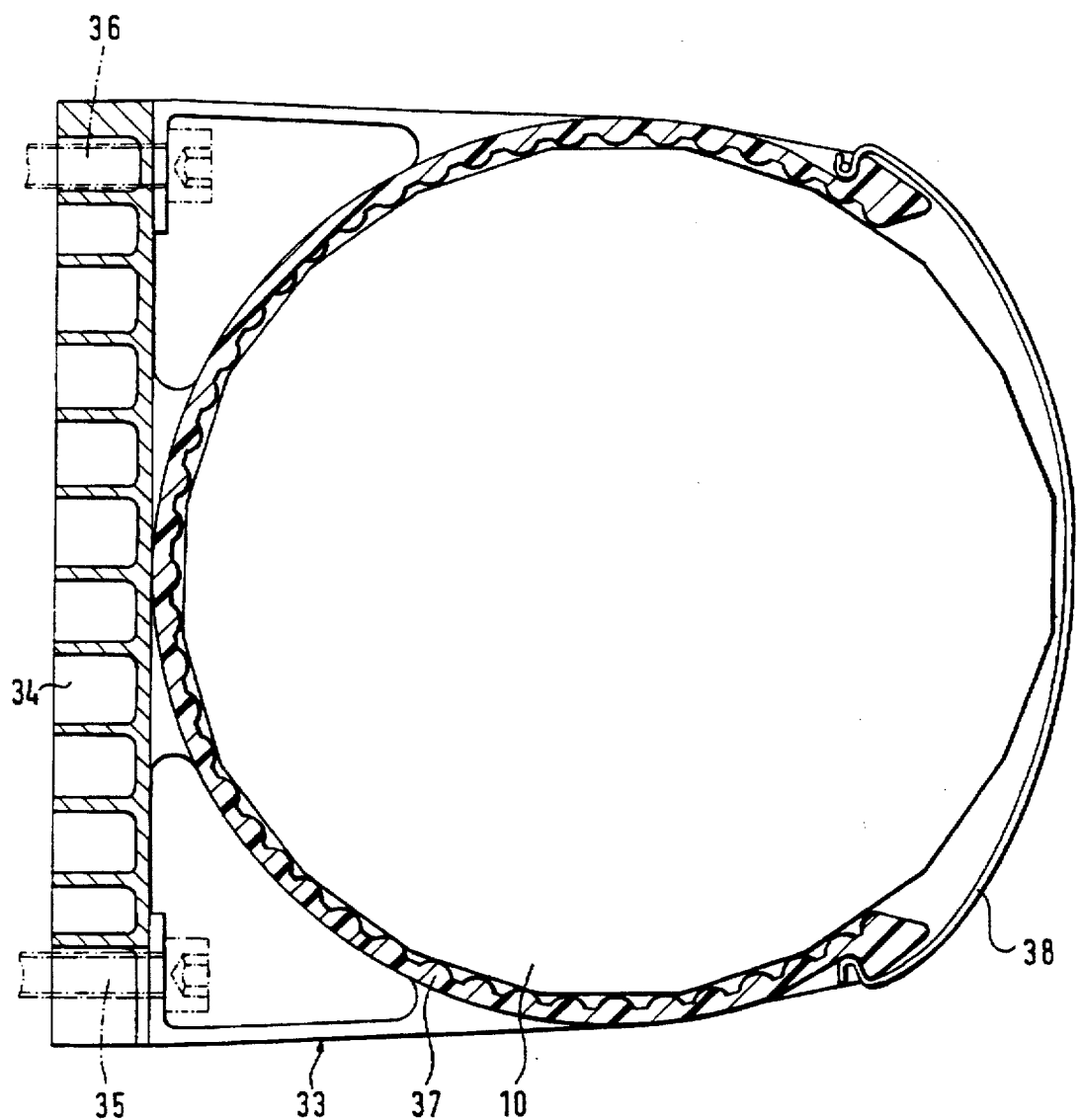
FIG. 2 The attachment element for the filter.

The FIG. 2 shows an attachment element for filters. The housing 10 of the filter is illustrated only schematically. The attachment element 33 comprises a base plate 34 which can be attached via screw connections 35, 36 to an external structure of a motor or a vehicle, not shown here in further detail. On the base plate 34 there is a receiver 37. This receiver is constructed in the form of a band, in the form of a circular section, which is approximately 40 mm wide. The receiver 37 engages detent recesses 39 provided in the housing 10 in the circumferential direction.

The filter 10 is surrounded by this band or receiver 37. A bow of spring steel 38 is attached to attachment ears of the receiver 37 and closes the filter receiver under tension. The band of spring steel is advantageously releasably attached on one side. On the other side it hangs on an ear.

The receiver 37 has recesses over its entire inner surface. The outer jacket of the filter 10 has a polygonal shape over its entire circumference. The polygonal shape is adapted to engage in the recesses and thereby secure the filter against undesired turning, while on the other hand allowing the filter to be secured in nearly any desired position.

The overall attachment element 33 is advantageously constructed as an injection molded synthetic plastic part. Attachment of the filter via such a synthetic plastic part has the advantage that vibrations, which are produced by the internal combustion engine, are damped at least in partial ranges, in the material of the attachment structure, and thereby exert a strongly reduced effect on the filter.

Figure 3:
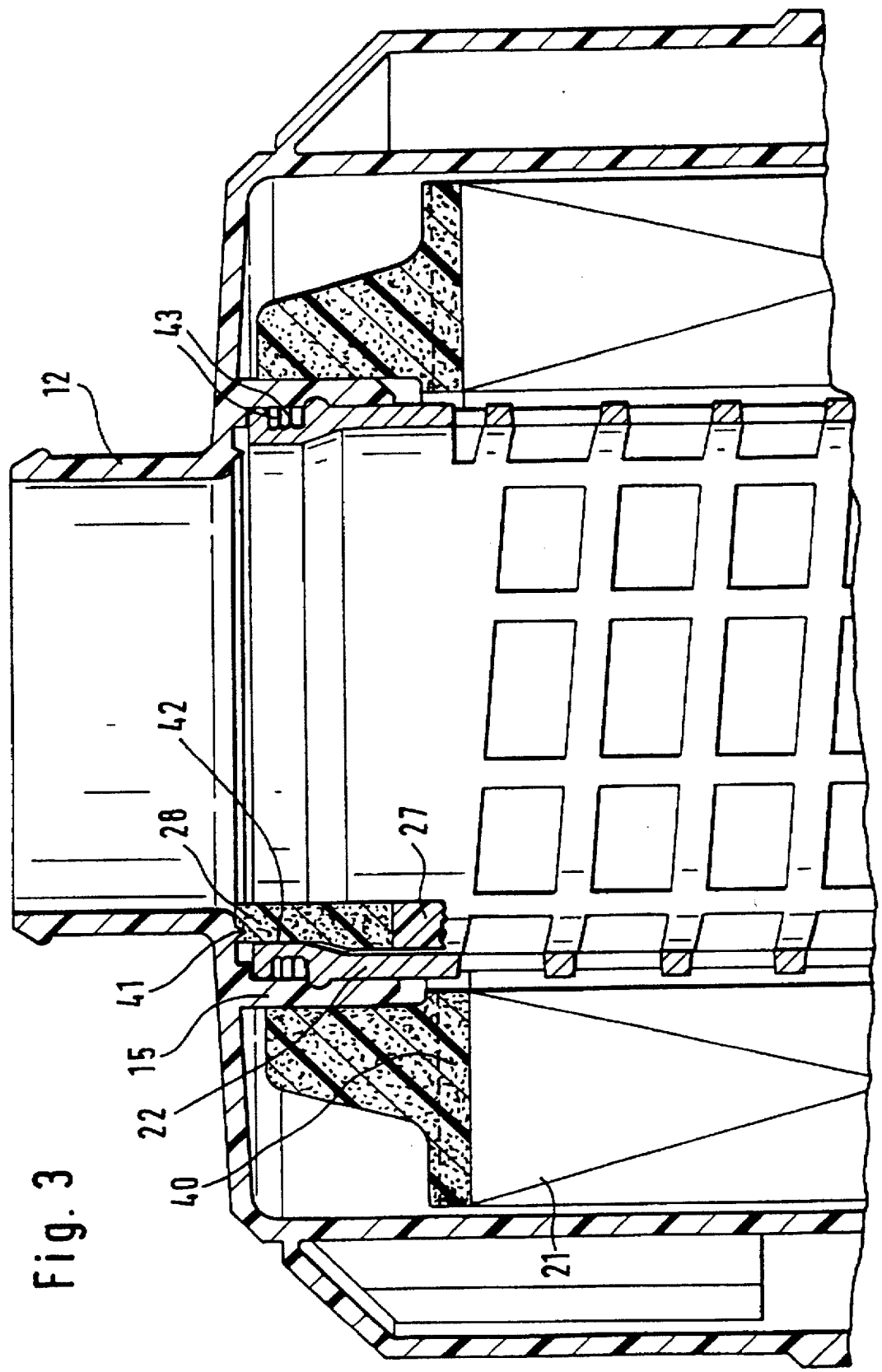
FIG. 3 A detail illustration of the forward region of the filter.

The FIG. 3 shows a detail illustration of the forward region of the filter. On the extension tube 12 an annular bulge 41 is provided. This serves to support the axial sealing effect in conjunction with the end face seal 28 of the secondary element 27, which is shown here only in part. In addition there is a radial seal in the region 42 between the end face seal 28 and the center tube 22. The center tube 22 is depicted in this figure as a synthetic plastic element. This is inserted in the extension tube 15 in a form-locked manner. In order to support the sealing effect between the extension tube 15 and the center tube 22, sealing lips 43 are arranged on the center tube 22. The filter insert 21 with its PUR foam end plate 40 is sealed via the outer wall of the extension tube 15.

Figure 4:
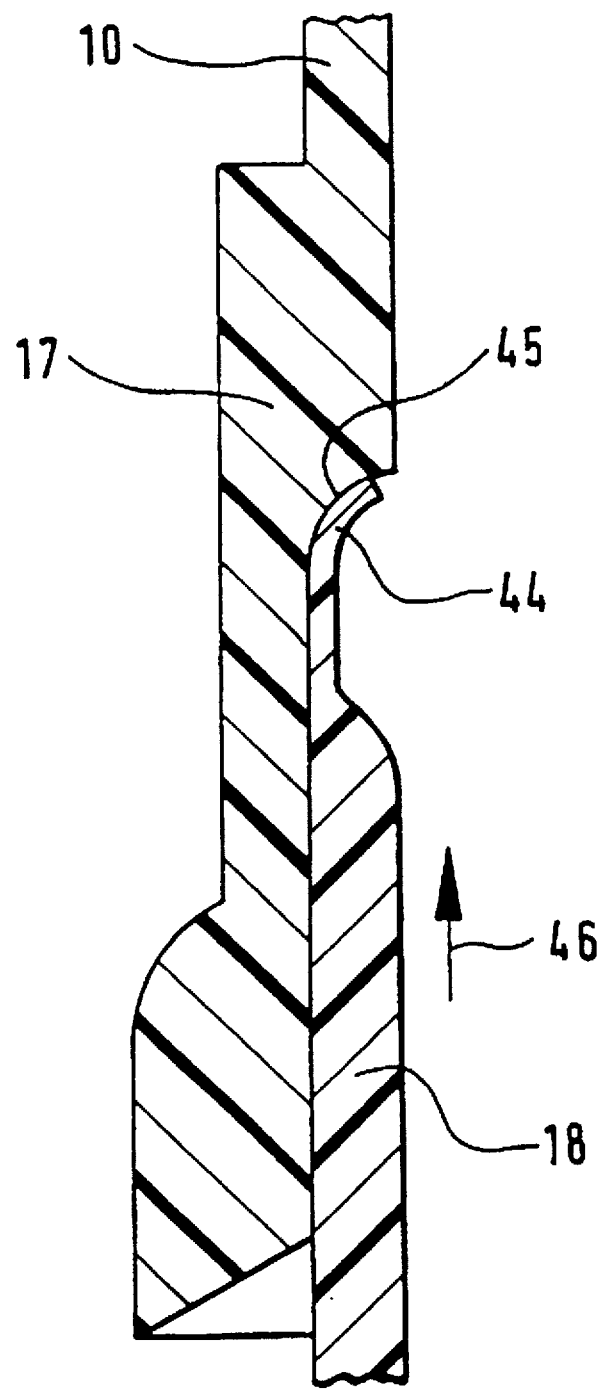
FIG. 4 The detail A from FIG. 1.

In FIG. 4 the detail A from FIG. 1 is shown and represents the seal between cover 18 and receiver 17. The cover 18 is equipped with a sealing lip 44. On the receiver 17 of the housing 10 there is an inwardly displaced sealing surface 45. As soon as the cover is pushed in accordance with arrow 46 to the end position, the sealing lip 44 nestles against the sealing surface 45 and forms therewith a reliable seal between the two parts of the housing.

What is claimed is:

1. An air filter for cleaning combustion air for an internal combustion engine, said filter comprising a substantially cylindrical housing having an unfiltered air inlet arranged substantially tangentially on an outer jacket surface of the housing and a clean air outlet arranged substantially concentrically at one axial end face of the housing; an extension tube arranged concentrically at the clean air outlet and extending interiorly into the filter, said extension tube having an inner wall to which a center tube extending further into the housing is attached; and a substantially metal-free filter insert disposed surrounding the center tube, said insert having a first axial end face facing the extension tube and provided with a radial, freely moveable sealing bulge extending axially away from said first axial end face in a direction opposite the filter insert and forming a radial seal in sealing contact with a surface of the extension tube, and said insert having a second axial end face which is closed.

2. A filter according to claim 1, wherein the housing comprises a cover at an end opposite the clean air outlet; the closed end face of the filter insert is disposed adjacent the cover, and the insert is supported in a force-locking manner against the cover by protrusions formed on the closed end face of the insert.

3. A filter according to claim 1, further comprising a secondary filter element arranged inside the center tube and releasably attached thereto, the secondary element having a closed first axial end face remote from the clean air outlet of the housing.

4. A filter according to claim 1, wherein the filter insert comprises a star-folded filter element of paper or fleece having axial ends embedded in first and second end plates, the end plates and the sealing bulge being formed of polyurethane resin foam.

5. A filter according to claim 1, wherein an annular groove is formed peripherally around the inner wall of the extension tube; an annular bead is formed peripherally around an outer wall of the center tube, and the bead is received in the groove to secure the center tube to the extension tube in a form-locked manner.

6. A filter according to claim 1, wherein a diverting wall is located on an inner wall of the housing adjacent the tangentially arranged unfiltered air inlet, whereby the tangentially arranged air inlet and the diverting wall cause air drawn into the filter to flow in spiral in order to centrifugally separate dust particles therefrom.

7. A filter according to claim 2, further comprising at least one detent latch element for attaching the housing and cover to each other in a form-locking manner, each detent latch element being connected via flexible web with one of the cover and the housing.

8. A filter according to claim 2, wherein a dust outlet opening is arranged in the cover.

9. A filter according to claim 2, wherein one of the cover and the housing is provided with at least one detent latch member, and the other of the cover and the housing is provided with an annular latch recess engagable by the at least one latch member, such that the cover can be attached in a form-locked manner in any desired rotational position relative to the housing.

10. A filter according to claim 1, wherein at least a portion of the housing has a polygonal cross-sectional shape; said filter further comprising an attachment device comprising a segmented flexible band extending around the polygonal cross-sectional portion of the housing with corners of the polygonal cross-sectional portion engaged between segments of the segmented band; the segmented band having ends attached to a spring steel band which applies tension to the segmented band.

11. A filter according to claim 10, with locking recesses arranged on the polygonal shape of the housing, the locking recesses being provided both in the circumferential direction and in the axial direction and facilitating form-locked attachment of the housing to the attachment device in positions which vary in the axial direction.

12. A filter according to claim 1, wherein the center tube is formed of synthetic plastic and is connected to the housing via the extension tube in a form-locked manner.

13. A filter according to claim 12, wherein the center tube is provided with at least one annular sealing rib in the area where it connects to the extension tube.

14. A filter according to claim 3, wherein the secondary element is provided with a release grip comprising at least one grip strap which can be grasped and lifted to remove the secondary element from the center tube.

15. A filter according to claim 3, wherein the secondary element is arranged with a second axial end face proximate the extension tube, and the second end face is provided with a seal.

16. A filter according to claim 15, wherein the seal is a radial seal.

17. A filter according to claim 15, wherein the seal is an axial seal.

18. A filter according to claim 17, wherein the extension tube is provided with an annular bulge adjacent the axial seal of the secondary element.

19. A filter according to claim 1, wherein said filter insert has a cylindrical inner peripheral surface and a cylindrical outer peripheral surface, said inner peripheral surface being aligned axially with said extension tube.

20. A filter according to claim 19, wherein said inner peripheral surface is located a first radial distance from a central axis of said filter insert, and said outer peripheral surface is located a second radial distance from said central axis, said sealing bulge being located between said first and second radial distances from said central axis.

* * * * *

UNITED STATES PATENT AND TRADEMARK OFFICE
CERTIFICATE OF CORRECTION

PATENT NO. : 5,730,769

DATED : March 24, 1998

INVENTOR(S) : Guenter Dungs, Peter Fischer, Klaus Moessinger, Guenter Thaller

It is certified that error appears in the above-indentified patent and that said Letters Patent is hereby corrected as shown below:

On the title page, item [54], and column 1, line 3;

AIR FILTER WITH SEALING BEAD FREELY MOVABLE
    IN THE RADIAL DIRECTION

Signed and Sealed this

Sixteenth Day of June, 1998

*Attest:*

BRUCE LEHMAN

*Attesting Officer*   Commissioner of Patents and Trademarks